United States Patent [19]

Sakai et al.

[11] Patent Number: 4,465,921
[45] Date of Patent: Aug. 14, 1984

[54] FLUX-CORED WIRE FOR GAS-SHIELDED ARC WELDING

[75] Inventors: Yoshiya Sakai; Yasuhiro Nagai, both of Fujisawa; Kazuo Ikemoto, Kamakura; Takakiyo Aoki, Yokohama; Hidehiko Kanehira, Kamakura, all of Japan

[73] Assignee: Kobe Steel, Limited, Kobe, Japan

[21] Appl. No.: 384,627

[22] Filed: Jun. 3, 1982

[30] Foreign Application Priority Data

Jun. 5, 1981 [JP] Japan .................................. 56-87366

[51] Int. Cl.³ .......................................... B23K 35/362
[52] U.S. Cl. ...................... 219/146.24; 219/137 WM; 219/145.22
[58] Field of Search ....... 219/146.1, 145.22, 137 WM, 219/146.24

[56] References Cited

U.S. PATENT DOCUMENTS

4,122,238 10/1978 Frantzerb, Sr. .................. 219/146.1
4,282,420 8/1981 Banks ............................. 219/146.24
4,366,364 12/1982 Arai et al. ...................... 219/145.22

Primary Examiner—Roy N. Envall, Jr.
Assistant Examiner—Alfred S. Keve
Attorney, Agent, or Firm—Oblon, Fisher, Spivak, McClelland & Maier

[57] ABSTRACT

A flux-cored welding electrode for gas-shielded arc welding comprising a mild steel sheath and a flux core, said flux core having the following composition based on the total weight of the electrode:
$TiO_2$–4 to 8.5%
Mg–0.2 to 0.8%
Ti–0.03 to 0.7%
B–0.002 to 0.025%
Mn–1.0 to 3.0%
Si–0.01 to 1.2%
Metal fluorides–0.1 to 0.30% as F-content
Oxides–not more than 8.5%, including $TiO_2$.

10 Claims, 2 Drawing Figures

FLUX-CORED WIRE FOR GAS-SHIELDED ARC WELDING

BACKGROUND OF THE INVENTION

1. Field of the Invention

This invention relates to a flux-cored wire for gas-shielded arc welding, which is improved in working characteristics and capable of producing a weld metal of excellent physical properties, particularly excellent impact properties at low temperature.

2. Description of the Prior Art

Gas-shielded arc welding using a flux-cored wire containing a titania-base flux and a shielding gas such as carbon dioxide gas, argon, helium or the like is widely employed for welding structures of mild steel and high tensile steel of 50 kgf/mm$^2$ class by reason of excellent bead appearance and superiority in performance quality and efficiency. However, the weld metal which is obtained by the use of a wire with a titania-base flux has a low impact value so that it has been considered difficult to apply such a flux-cored wire to thick plates (e.g., thicker than 25 mm) which require welding of a large heat input, or to steels of higher classes which are governed by severe standards as regards impact value, including the grade III Rules for American Bureau of Shipping (e.g., higher than 5.5 kgf-m at $-45°$ C. to $-60°$ C.).

As disclosed in Applicants' Japanese Patent Publication No. 56-6840, a wire with a titania-base fluxing material containing suitable amounts of Ti and/or TiO$_2$ and B and/or B$_2$O$_3$ in a filler flux ensures good working characteristics in welding operation and can form a weld metal of good impact value at low temperature, but said metal has a high fracture transition temperature (vTrs: 50% brittle fracture), making it unsuitable as a welding material for the low temperature steels which require a high impact value at $-45°$ C. to $-60°$ C.

On the other hand, with regard to a wire using a flux other than the titania-base flux, it is known, for example, from Laid-Open Japanese Patent Application No. 52-116746 that a wire using a basic flux has a good impact value but is inferior to a wire with a titania-base flux in bead appearance and shape and working characteristics in welding operation (imperfect slag covering and much spattering).

SUMMARY OF THE INVENTION

There are two approaches which are conceivable for overcoming the above-mentioned problems, namely, (1) to improve the impact value at low temperature of the titania-base flux-cored wire while retaining its performance quality, or (2) to improve at least the performance quality of the basic flux-cored wire while retaining its inherent good impact value at low temperature. The present inventors sought a solution by the first approach and, as a result of an extensive study, succeeded in tracing some facts about the cause of inferior impact value at low temperature of the titania-base flux-cored wire.

More particularly, the TiO$_2$, which is an essential component in the titania-base flux, is an acidic component and difficultly separated as a slag in the welding process and tends to remain in the deposited metal as a non-metallic inclusion. Especially in a case using carbon dioxide or other oxidative gas for the shielding gas, the oxygen content in the deposited metal would reach as high as 700 to 900 ppm, presumably causing a detrimental drop in the impact value at low temperature. Upon studying the oxygen content in the deposited metal in relation with the impact value at low temperature (notch toughness), it has been revealed that the oxygen content in the deposited metal has to be held to less than 550 ppm in order to satisfy the impact value standard as applied, for example, to low temperature steels such as aluminum-killed steel (higher than 2.8 kgf-m at $-45°$ to 60° C.). Therefore, the impact value at low temperature can be improved by defining a flux composition which would hold the oxygen content in the deposited metal to a suitably low level and, desirably, which would make the crystalline structure of the deposited metal finer to attain a higher impact value at low temperature.

On the basis of that finding, the present inventors continued their research to develop a titania-base flux-cored wire which would lower the oxygen content in the deposited metal and refine the crystalline structure, without impairing the inherent performance characteristics of the titania-base flux-cored wire, and arrived at the present invention.

Accordingly, it is an object of the present invention to provide a flux-cored welding electrode which provides excellent impact value at low temperatures. It is a further object of this invention to provide a flux-cored welding electrode capable of forming a bead having excellent appearance and performance characteristics. It is a further object of the present invention to provide a flux-cored welding electrode yielding a weld with an oxygen content of less than 550 ppm in the deposited metal. It is yet a further object of the present invention to provide a flux-cored welding electrode yielding a weld having improved crystal structure in the deposited metal.

It has now been found that the above and other objects of this invention are obtained by a flux-cored welding electrode for gas-shielded arc welding comprising a mile steel sheath and a flux core, said flux core having the following composition based on the total weight of the electrode:

TiO$_2$—4 to 8.5%
Mg—0.2 to 0.8%
Ti—0.03 to 0.7%
B—0.002 to 0.025%
Mn—1.0 to 3.0%
Si—0.1 to 1.2%
Metal Fluorides—0.01 to 0.30% as F-content
Oxides—not more than 8.5%, including TiO$_2$.

BRIEF DESCRIPTION OF THE DRAWINGS

A more complete description of the invention and many of the attendant advantages thereof will be readily obtained as the same becomes better understood by reference to the following detailed description when considered in connection with the accompanying drawings wherein.

DESCRIPTION OF THE PREFERRED EMBODIMENTS

The above-defined ranges of the respective components in the titania-base flux employed in the present invention have the following basis.

The component $TiO_2$ which is a main component of the titania-base flux is essential as a slag-forming agent and at the same time as an arc stabilizer, so that it should be contained in the range of 4–8.5% (wt % to the total wire weight and the same applies hereinafter unless otherwise specified). $TiO_2$ has suitable properties as an agent for forming a slag of excellent covering and removability and as an arc stabilizing agent, which cannot be expected from other slag-forming agents. If the $TiO_2$ content is less than 4%, it becomes difficult to obtain a bead of good appearance and shape, with increased spattering. On the other hand, if its content exceeds 8.5%, slag is produced in an excessive amount, giving rise to slag inclusion and thus lowering the performance quality in welding operation. Rutile, reduced ilmenite or the like are used as a raw material for $TiO_2$.

As mentioned hereinbefore, the acidic component $TiO_2$ tends to remain in the deposited metal as a non-metallic inclusion so that, when an oxidative shielding gas is used, oxygen content in the deposited metal is increased lowering the notch toughness. However, it has been found that a filler flux which contains a suitable amount of Mg can effectively lower the level of oxygen in the deposited metal by its reducing action.

Figure 1:
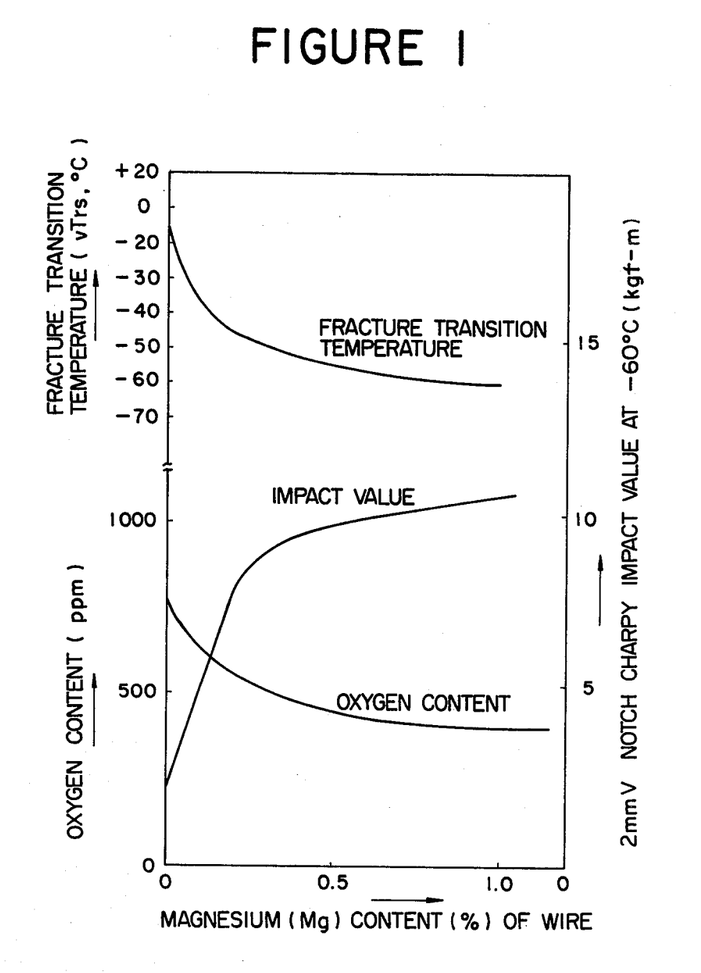
FIG. 1 is a graph showing the Mg-contents of various wires in relation with the oxygen content, impact value and fracture transition temperature of deposited metals formed by the wires.

More specifically, FIG. 1 shows the oxygen contents of deposited metals obtained by the use of the following welding materials and welding conditions, in relation with Charpy impact value and fracture transition temperature.

| [Welding Materials] | |
|---|---|
| Sheathing material: | Cold-rolled steel (0.03% C; 0.3% Mn; 0.01% Si; 0.011% P; 0.015% S) |
| Filler flux: | 5% $TiO_2$; 0.16% Ti; 0.012% B; 1.9% Mn; 0.35% Si; 0.14% $CaF_2$; 0–1.0% Mg |
| Wire diameter: | 1.2 mm$\phi$ |

| [Welding Conditions] | |
|---|---|
| Base metal: | JIS G 3216, SLA33B, 19 mm thick plate |
| Groove preparation: | Groove angle of 45° V, root gap of 12 mm, backing metal of 9 mm thick plate |
| Welding current: | 280A, DC of reverse-polarity |
| Arc voltage: | 29 V |
| Wire extension: | 20 mm |
| $CO_2$ flow rate: | 20 l/min |
| Number of layer and pass | 6-layers, 12-passes |

As clear from FIG. 1, the oxygen content in the weld metal is lowered as the Mg content is increased, and held below 550 ppm when the Mg content is higher than 0.2%. Beyond a turning point in the vicinity of the Mg content of 0.2%, an increase in the Mg content is reflected by a higher impact value and a lower fracture transition temperature. Namely, even with a titania-base flux, it is possible to lower the fracture transition temperature of the deposited metal and to enhance its low temperature impact value drastically by holding the oxygen content in the deposited metal to a low level by addition of more than 0.2% of Mg. However, if Mg is added excessively, the fluidity of the slag will be lowered by an increase of high melting point MgO, resulting in deteriorated slag covering and poor performance quality with increased amounts of spatter and fumes. Therefore, the Mg content should be limited to 0.8% or less.

Besides the metal Mg, a Mg source can be found in Mg alloys such as Al-Mg, Si-Mg, Si-Ca-Mg, Ca-Mg and Ni-Mg which are relatively slow in reaction as compared with the metal Mg and therefore can contribute to reduced spattering.

The components Ti and B have an effect of enhacing the impact value of the deposited metal by making the crystal grains finer. The improvement of the notch toughness by Ti and B, which has already been a subject of various studies, is considered to be attributable to their effect of reducing the content of nitrogen in solid solution, which imposes an adverse effect on the growth of fine acicular ferrite structure and the notch toughness. Although they were expected to produce similar effects in the present invention, it has been confirmed by experiments that these elements show a quite characteristic tendency depending upon their additive amount.

Figure 2:
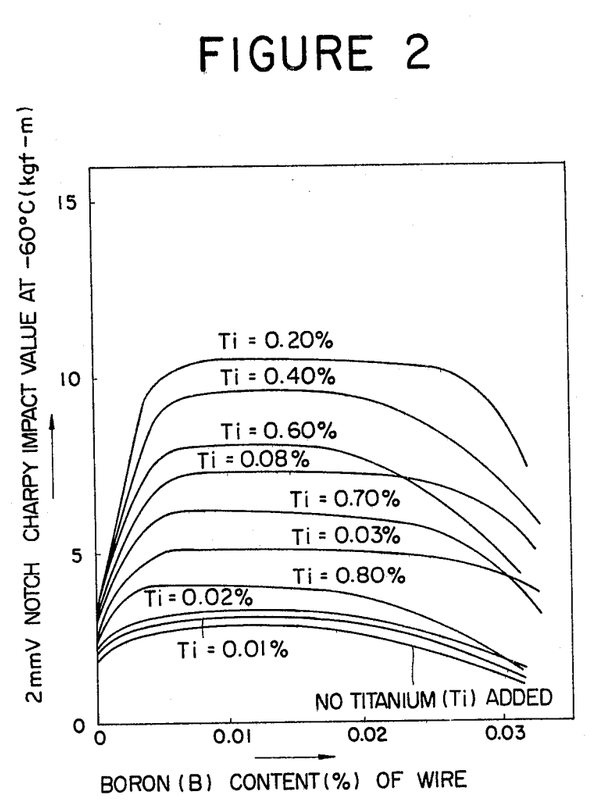
FIG. 2 is a graph showing B and Ti contents of various wires in relation to the impact value of the deposited metals formed by the wires.

Plotted in FIG. 2 are Charpy impact values at center positions of deposited metals obtained by experiments under the same conditions as in the examples shown in FIG. 1 except for variations of the Ti and B contents in a filler flux which basically consisted of 5% of $TiO_2$, 0.52% of Mg, 1.9% of Mn, 0.35% of Si and 0.14% of $CaF_2$.

As is clear from FIG. 2, the notch toughness is improved conspicuously by addition of 0.03% of Ti or more. However, with a Ti content in excess of 0.7%, the strength of the deposit metal is increased excessively due to an extravagant yield of Ti in the deposited metal, thereby lowering the notch toughness. Namely, a Ti-content in the range of 0.03–0.7% is most effective for the improvement of the notch toughness. The foregoing conspicuous effect of Ti cannot be produced if added in the form of an oxide, so that Ti should be added in the form of metal Ti or alloys of Fe-Ti and the like, which also act as a deoxidizing agent to lower the oxygen content of the deposited metal.

The component B, if added in amounts of more than 0.002%, has an excellent effect of improving the notch toughness. However, if it exceeds 0.025%, there will occur an abrupt drop in its impact value improving effect, with higher susceptability to cracking due to an increased tensile strength by hardening. The component B may be added in the form of an alloy such as Fe-B or the like or in the form of boron oxide which will be reduced to B in the welding operation to play a similar role.

The component Mn has an effect of maintaining good usability by improving the appearance and shape of the bead as well as an effect of accelerating deoxidation of the deposited metal while enhancing its strength by remaining there. In order to secure these effects, the additive amount of Mn should be greater than 1.0%. However, if the additive amount of Mn exceeds 3.0%, the deposited metal becomes susceptible to cracking by an excessively intensified strength due to an increase of Mn-content in the deposited metal.

Similarly to Mn, the component Si has an effect of improving the shape and appearance of bead and the usability in addition to the effect of accelerating deoxidation of the deposited metal, and partly remains in the deposited metal to enhance its strength. These effects are produced in a practical degree when Si is added in amounts of more than 0.1%. However, if added in amounts of more than 1.2%, the crystal grains are coarsened by an increased Si content, lowering the notch toughness of the deposited metal. Examples of Mn and Si sources include electrolytic Mn, alloys such as Fe-Mn, Fe-Si, Si-Mn and the like.

The metal fluoride has the effect of stabilizing the arc and enhancing the crack resistability of the deposited metal by its dehydrating action. These effects are produced in a practical degree when the additive amount of the fluorine is greater than 0.01% but, if it exceeds 0.30% as F-content the performance quality will be lowered with increased amounts of spatter and fumes and deteriorated bead shape due to excessive fluidity of the slag. Generally used as the metal fluoride are the fluorides of the alkali metals and alkali earth metals, including Na, K, Li, Mg, Ca and the like.

Further, according to the present invention, oxides such as iron oxide, $SiO_2$, $Al_2O_3$, $ZrO_2$, or the like may be added jointly with the foregoing components in a proportion of less than 8.5% including the aforementioned $TiO_2$. Oxide contents in excess of 8.5% will be reflected by an unduly increased amount of slag, inviting slag inclusions at higher frequencies and a drop in the performance quality.

In addition to the foregoing components, the filler flux according to the present invention may further contain an alloy element or elements within a range which satisfies the above-mentioned conditions. For instance, there may be added 1-4% of Ni of enhance further the impact value at low temperature at the levels of $-60°$ C. to $-80°$ C., or either 0.1-1.1% Mo or 0.2-3.5% Cr to increase the high temperature strength. As a deoxidizing or denitrifying agent or for preventing dribbling from the molten pool in vertical position welding, Al or Zr may be added in a proportion of less than 0.5% based on the total weight of the wire. For the purpose of improving the weather-proofing characteristics, a small amount of Ni, Cr, Cu or P may also be added. Further, for the stabilization of arc, an oxide or a carbonate of an alkali metal such as K, Na or Li, a compound of a rare earth element such as Ce and La or iron powder may be contained in the filler flux.

The filler flux of the above composition is filled in a sheath of mild steel according to an ordinary method to form a flux-cored wire. From the standpoint of workability after flux filling, the sheathing mild steel is preferred to be a cold-rolled steel or a hot-rolled steel with good drawability. The flux filling ratio has no restrictions in particular but is suitably in the range of 10 to 30% of the total weight of the wire.

As is clear from the foregoing description, the present invention employs a titania-base flux which contains $TiO_2$ as a major component along with other additive components of strictly defined kinds and amounts, and which is satisfactory in performance quality in welding operations as well as in the appearance and shape of bead and capable of forming a weld metal with a low oxygen content and an excellent impact value at lower temperatures. Consequently, the present invention drastically broadens the application of the titania-base flux-cored wire, permitting its use in the welding of thick steel plate for low temperature use while improving the performance quality of the wire and the appearance and shape of the bead.

The invention is illustrated more particularly by the following experimental examples, which are provided herein for purposes of illustration only and are not intended to be limiting unless otherwise specified.

EXPERIMENT 1

Flux-cored wires of 1.2 mm$\phi$ diameter were produced by filling the titania-base fluxes of the composition shown in Table 1 in a mild steel sheath (0.03%C, 0.3%Mn, 0.01%Si, 0.010%P and 0.014%S) at a flux filling ratio of 15%. In Table 1, the titania-base fluxes are grouped into composition systems of Mn-Si, Mn-Mo, Mn-Ni, Mn-Mo-Ni and Cr-Mo.

TABLE 1

| Wire No. | Composition system | Flux Composition (wt % to total wire weight) | | | | | | | | | | | | |
|---|---|---|---|---|---|---|---|---|---|---|---|---|---|---|
| | | $TiO_2$ | Mg | Ti | B | Mn | Si | Metal fluoride (F value) | | | Al | Ni | Cr | Mo | $SiO_2$ |
| | | | | | | | | $CaF_2$ | NaF | $MgF_2$ | | | | | |
| 1 | Mn—Si | 5.5 | 0.65 | 0.25 | 0.020 | 1.98 | 0.35 | 0.35 (0.15) | — | — | 0.17 | — | — | — | 0.30 |
| 2 | | 5.5 | 0.35 | 0.12 | 0.005 | 1.98 | 0.35 | — | 0.30 (0.14) | — | — | — | — | — | 0.30 |
| 3 | | 4.5 | 0.45 | 0.60 | 0.009 | 1.98 | 0.35 | — | 0.80 (0.03) | — | — | — | — | — | 0.30 |
| 4 | | 4.0 | — | — | 0.025 | 2.34 | 0.51 | 0.20 (0.10) | — | — | — | — | — | — | 2.00 |
| 5 | Mn—Mo | 5.0 | 0.35 | 0.12 | 0.009 | 1.98 | 0.35 | 0.45 (0.20) | — | — | — | — | — | 0.30 | 0.35 |
| 6 | | 4.5 | — | — | — | 2.15 | 0.50 | — | — | — | — | — | — | 0.30 | 1.10 |
| 7 | Mn—Ni | 4.5 | 0.60 | 0.20 | 0.008 | 1.90 | 0.30 | 0.30 (0.15) | — | — | — | 1.60 | — | — | 0.30 |
| 8 | | 4.0 | — | — | 0.025 | 2.00 | 0.50 | 0.20 (0.10) | — | — | 0.07 | 1.60 | — | — | 0.80 |
| 9 | | 4.5 | 0.45 | 0.20 | 0.008 | 1.70 | 0.25 | — | — | 0.30 (0.12) | — | 3.75 | — | — | 0.30 |
| 10 | | 4.0 | — | — | 0.025 | 2.00 | 0.50 | 0.30 (0.15) | — | — | — | 3.75 | — | — | 0.80 |
| 11 | Mn—Mo | 5.0 | 0.50 | 0.20 | 0.006 | 1.80 | 0.40 | 0.50 (0.24) | — | — | — | 0.85 | — | 0.55 | 0.50 |
| 12 | | 4.0 | — | — | 0.006 | 2.00 | 0.50 | 0.20 (0.10) | — | — | — | 0.85 | — | 0.55 | 2.00 |
| 13 | 1.25Cr | 5.0 | 0.50 | 0.20 | 0.006 | 1.40 | 0.40 | 0.50 (0.24) | — | — | — | — | 1.30 | 0.55 | 0.50 |

TABLE 1-continued

| | | | | | | | | | | | | | | |
|---|---|---|---|---|---|---|---|---|---|---|---|---|---|---|
| 14 | —0.5Mo | 4.0 | — | — | 0.006 | 1.50 | 0.50 | 0.20 (0.10) | — | — | — | — | 1.30 | 0.55 | 2.00 |
| 15 | 2.25Cr | 5.0 | 0.50 | 0.20 | 0.006 | 1.20 | 0.30 | 0.50 (0.24) | — | — | — | — | 2.35 | 1.10 | 0.50 |
| 16 | —1.0Mo | 4.0 | — | — | 0.006 | 1.50 | 0.50 | 0.20 (0.10) | — | — | — | — | 2.35 | 1.10 | 2.00 |

| Wire No. | Composition system | Flux Composition (wt. % to total wire weight) | | | Remarks |
|---|---|---|---|---|---|
| | | Iron oxide (total FeO) | ZrO$_2$ | CaCo$_3$ | |
| 1 | Mn—Si | 0.10 | 0.11 | — | Invention. |
| 2 | | 0.10 | 0.11 | — | Invention. |
| 3 | | — | 0.08 | — | Invention. |
| 4 | | — | — | 0.20 | Comparative |
| 5 | Mn—Mo | — | — | — | Invention |
| 6 | | — | — | — | Comparative |
| 7 | Mn—Ni | 0.05 | 0.10 | — | Invention |
| 8 | | — | 0.10 | — | Invention |
| 9 | | 0.05 | 0.10 | — | Invention |
| 10 | | — | 0.10 | — | Comparative |
| 11 | Mn—Mo | — | 0.20 | — | Invention |
| 12 | | — | — | 0.20 | Comparative |
| 13 | 1.25Cr | — | 0.20 | — | Invention |
| 14 | —0.5Mo | — | — | 0.20 | Comparative |
| 15 | 2.25Cr | — | 0.20 | — | Invention |
| 16 | —1.0Mo | — | — | 0.20 | Comparative |

(15% in total sum, the balance consisting of iron and impurities)

The flux-cored wires thus obtained were used for welding under the following conditions, and the weld metals formed by the respective flux-cored wire were examined for their tensile and impact properties, with the results as shown in Tables 2(A) and 2(B).

| [Welding Condition] | |
|---|---|
| Welding current | DC of reverse-polarity, 280 A |
| Arc voltage: | 29 V |
| Welding speed: | 20–30 cm/min |
| Shielding gas: | CO$_2$, 20 l/min |
| Wire extension: | 20–25 mm |
| Groove preparation | 45° v-beveling with a root gap of 12 mm and a backing of 9 mm thick plate |
| Base metals: | 19 mm thick plates of various kinds (See Table 2) |
| Number of layer and pass | 6-layers 12-passes |

In all cases, the flux-cored wire showed good performance quality, forming a bead of good shape and apperance without any objectionable degree of spattering and fume during the welding operation. The physical properties of the deposited metal were examined from a specimen which was taken from a transverse middle portion of the deposited metal.

TABLE 2

| Wire No. | Composition system | Base Metal | Chemical composition of deposited metal (%) | | | | | | | | | Heat* treatment (PWHT) (°C × hr.) | Tensile properties | | | 2mmV notch charpy impact properties | | | | | Fracture transition temperature (°C) | Remark |
|---|---|---|---|---|---|---|---|---|---|---|---|---|---|---|---|---|---|---|---|---|---|---|
| | | | C | Mn | Si | Al | Ni | Cr | Mo | Ti | B | | yield point (kgf/mm²) | Tensile strength (kgf/mm²) | Elongation (%) | Absorbed energy (kgf – m) Test temperature (°C) | | | | | | |
| | | | | | | | | | | | | | | | | 0 | −20 | −45 | −60 | −85 | | |
| 1 | Mn—Si | Jis SLA-33B | 0.05 | 1.22 | 0.30 | 0.02 | — | — | — | 0.07 | 0.007 | As welded | 46.5 | 56.7 | 31 | 12.4 | 12.1 | 11.2 | 9.0 | 2.8 | −60 | Invention |
| 2 | | | 0.05 | 1.19 | 0.29 | — | — | — | — | 0.06 | 0.002 | As welded | 46.1 | 55.2 | 31 | 13.6 | 12.8 | 9.2 | 8.5 | 2.4 | −47 | Invention |
| 3 | | | 0.04 | 1.26 | 0.32 | — | — | — | — | 0.08 | 0.004 | As welded | 46.9 | 56.9 | 30 | 13.2 | 12.7 | 11.6 | 8.1 | 2.0 | −54 | Invention |
| 4 | | | 0.06 | 1.35 | 0.32 | — | — | — | — | 0.06 | 0.011 | As welded | 48.1 | 57.2 | 29 | 11.5 | 9.0 | 4.2 | 1.9 | — | −18 | Comparative |
| 5 | Mn—Mo | ASTM A302 | 0.05 | 1.18 | 0.30 | — | — | — | 0.24 | 0.06 | 0.003 | 620 × 1 S.R. | 47.8 | 54.2 | 28 | 11.8 | 11.2 | 8.3 | — | — | −40 | Invention |
| 6 | | Grade B | 0.5 | 1.24 | 0.27 | — | — | — | 0.23 | 0.06 | — | 620 × 1 S.R. | 46.8 | 56.8 | 27 | 5.6 | 3.0 | 2.6 | — | — | −5 | Comparative |
| 7 | Mn—Ni | JIS SLA-33B | 0.04 | 1.20 | 0.25 | — | 1.48 | — | — | 0.05 | 0.002 | 620 × 1 S.R. | 53.6 | 59.9 | 27 | 12.5 | 12.2 | 11.6 | 10.5 | 6.8 | −69 | Invention |
| 8 | | | 0.04 | 1.27 | 0.28 | 0.01 | 1.45 | — | — | 0.07 | 0.010 | 620 × 1 S.R. | 54.7 | 63.2 | 25 | 11.2 | 10.5 | 5.6 | 3.5 | 2.1 | −32 | Invention |
| 9 | | ASTM A203 | 0.04 | 0.87 | 0.16 | — | 3.17 | — | — | 0.03 | 0.002 | 620 × 1 S.R. | 50.8 | 57.4 | 28 | 12.2 | 12.0 | 11.9 | 11.6 | 8.2 | −80 | Invention |
| 10 | | Grade E | 0.05 | 1.21 | 0.30 | — | 3.66 | — | — | 0.06 | 0.009 | 620 × 1 S.R. | 50.7 | 62.1 | 27 | 10.5 | 9.8 | 6.2 | 4.1 | 2.3 | −44 | Comparative |
| 11 | Mn—Mo—Ni | ASTM A533 | 0.04 | 1.30 | 0.35 | — | 0.80 | — | 0.47 | 0.04 | 0.002 | 620 × 1 S.R. | 62.0 | 67.8 | 27 | 15.4 | 10.0 | 4.5 | — | — | −22 | Invention |
| 12 | | Grade Class 1 | 0.04 | 1.28 | 0.31 | — | 0.78 | — | 0.51 | 0.06 | 0.002 | 620 × 1 S.R. | 61.8 | 68.6 | 25 | 6.7 | 3.8 | 2.0 | — | — | −7 | Comparative |
| 13 | 1.25Cr | ASTM A387 | 0.05 | 1.10 | 0.38 | — | — | 1.22 | 0.49 | 0.05 | 0.002 | 690 × 1 S.R. | 61.5 | 68.0 | 24 | 15.7 | 10.5 | 5.1 | 1.1 | — | −18 | Invention |
| 14 | 0.5Mo | Grade 11 | 0.05 | 1.06 | 0.33 | — | — | 2.26 | 0.52 | 0.07 | 0.003 | 690 × 1 S.R. | 62.8 | 69.5 | 20 | 4.5 | 2.7 | 1.1 | — | — | +2 | Comparative |
| 15 | 2.25Cr | ASTM A387 | 0.05 | 0.85 | 0.30 | — | — | 2.30 | 1.05 | 0.05 | 0.002 | 690 × 1 S.R. | 61.0 | 68.6 | 23 | 8.2 | 4.3 | 1.9 | — | — | −1 | Invention |
| 16 | −1Mo | Grade | 0.06 | 0.98 | 0.28 | — | — | 2.27 | 0.98 | 0.07 | 0.002 | 690 × 1 S.R. | 64.1 | 70.8 | 19 | 4.1 | 1.8 | 1.0 | — | — | 0 | Comparative |

*S.R. indicates stress relief annealing after welding.

As clear from Table 1 and the results shown in Tables 2(A) and 2(B), the absolute value of the impact property of the deposited metal varies largely depending upon the composition of the flux and the type of the base metal. However, upon comparing the examples of the same block, it will be clear that the examples which satisfy the conditions of the present invention far exceed the comparative examples in the impact properties of the deposited metal particularly in the absorbed energy at low temperatures, as well as in the value of the fracture transition temperature. No difference is observed between the examples according to the invention and the comparative examples in the tensile properties of the deposited metal.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A flux-cored welding electrode for gas-shielded arc welding comprising a mild steel sheath and a flux core, said flux core comprising, based on the total weight of the electrode:
$TiO_2$—4 to 8.5%
Mg—0.2 to 0.8%
Ti—0.03 to 0.7%
B—0.002 to 0.025%
Mn—1.0 to 3.0%
Si—0.1 to 1.2%
Metal Fluorides—0.01 to 0.30% as F-content
Oxides—not more than 8.5%, including $TiO_2$.

2. The flux-cored welding electrode of claim 1 wherein the Mg source for the flux core is selected from the group consisting of metallic Mg and Mg alloys.

3. The flux-cored welding electrode of claim 1 wherein the boron source for the flux core is selected from the group consisting of B, $B_2O_3$ and boron-containing alloys.

4. The flux-cored welding electrode of claim 1 wherein the Ti source is selected from the group consisting of metallic Ti and Ti alloys.

5. The flux-cored welding electrode of claim 1 containing, in addition, 1-4% Ni based on the total weight of the electrode.

6. The flux-cored welding electrode of claim 1 containing, in addition, an additive selected from the group consisting of 0.1 to 1.1% Mo and 0.2 to 3.5% Cr, based on the total weight of the electrode.

7. The flux-cored welding electrode of claim 1 containing, in addition, 0.01 to 0.5% of a metal selected from the group consisting of Al and Zr.

8. The flux-cored welding electrode of claim 1 wherein the flux core makes up 10-30% by weight of the electrode.

9. The flux-cored welding electrode of claim 1 wherein the flux-core has the following composition:
$TiO_2$—5.0%
Mg—0.5%
Ti—0.16%
B—0.012%
Mn—1.9%
Si—0.35%
$CaF_2$—0.14%

10. The flux-cored welding electrode of claim 1 wherein the electrode has a diameter of 1.2 mm.

* * * * *

UNITED STATES PATENT AND TRADEMARK OFFICE
CERTIFICATE OF CORRECTION

PATENT NO. : 4,465,921
DATED : August 14, 1984
INVENTOR(S) : YOSHIYA SAKAI

It is certified that error appears in the above-identified patent and that said Letters Patent is hereby corrected as shown below:

In Abstract line 11, "Metal Fluorides - 0.1..." should be "Metal fluorides - 0.01...".

Col. 1, line 6 and line 12,............delete "1." and "2." before subheads - make flush left.

Col. 1, line 62,............."difficultly separated" should be "separated with difficulty".

Col. 2, line 40,............"are" should be "arc".

Col. 4, line 9,................."a Mg" should be "an Mg".

Col. 4, line 14,................."enhacing" should be "enhancing".

Col. 5, line 36,................."of enhance" should be "to enhance".

UNITED STATES PATENT AND TRADEMARK OFFICE
CERTIFICATE OF CORRECTION

PATENT NO. : 4,465,921

DATED : August 14, 1984

INVENTOR(S) : YOSHIYA SAKAI

It is certified that error appears in the above-identified patent and that said Letters Patent is hereby corrected as shown below:

Col. 8, lines 53-54,................. "apperance" should be "appearance".

Cols. 5 and 6, Table 1,................. 4 columns of table need to be aligned with rest of table.

Cols. 5 and 6, Table 1. there should be a dash under column heading "NaF".

Cols. 5, 6. Table 1,........................ Under the heading "Composition System" and beside Wire No. 11, this should read: "Mn-Mo-Ni".

Col. 7. Table 1,.............................. Put an asterisk before the note "(15% in total sum, the balance consisting of iron and impurities)" under the table.

UNITED STATES PATENT AND TRADEMARK OFFICE
CERTIFICATE OF CORRECTION

PATENT NO. : 4,465,921

DATED : August 14, 1984

INVENTOR(S) : YOSHIYA SAKAI

It is certified that error appears in the above-identified patent and that said Letters Patent is hereby corrected as shown below:

Table 2. Cols. 9, 10.,............ Under "Remark," "Invention" should say "Comparative".

Table 2. Cols. 9, 10.,........... Under heading "Ni" in table, "3.17" should be "3.71".

Table 2..................... move "Ni" under column entitled "Composition system" up by "Mn-Mo-" above it.

Cols. 9, 10. Table 2..................... put "B" beside "Grade" under title heading "Base Metal".

Cols. 9, 10. Table 2..............Under heading title "Composition system" and beside "Wire No. 14", this nunber should be: "0.05 Mo".

Cols. 9,10. Table 2.................... put "22" beside the word "Grade" under title heading, "Base Metal".

Cols. 7 and 8, Table 1........................ Under title heading "Remarks," and across from "Wire No. 8," "Invention" should be "Comparative".

Signed and Sealed this

Twelfth Day of March 1985

[SEAL]

Attest:

DONALD J. QUIGG

Attesting Officer

Acting Commissioner of Patents and Trademarks